United States Patent [19]

Kopp et al.

[11] Patent Number: 5,675,633
[45] Date of Patent: Oct. 7, 1997

[54] DIGITAL TELEPHONE ANSWERING SET

[75] Inventors: Dieter Kopp, Hemmingen; Jürgen Sienel, Leonberg, both of Germany

[73] Assignee: Alcatel N.V., Rijswijk, Netherlands

[21] Appl. No.: 499,430

[22] Filed: Jul. 7, 1995

[30] Foreign Application Priority Data

Jul. 20, 1994 [DE] Germany ............... 44 25 579.9
May 12, 1995 [DE] Germany ............... 195 17 470.4

[51] Int. Cl.$^6$ ............................... H04M 1/65
[52] U.S. Cl. ............................... 379/88; 379/67
[58] Field of Search ............... 379/67, 68, 73, 379/74, 77, 85, 88, 89, 97, 100

[56] References Cited

U.S. PATENT DOCUMENTS

| | | | |
|---|---|---|---|
| 4,531,182 | 7/1985 | Hyatt | 364/474.11 |
| 5,289,529 | 2/1994 | Karnowski | 379/88 |
| 5,406,618 | 4/1995 | Knuth et al. | 379/67 |
| 5,453,986 | 9/1995 | Davis et al. | 379/202 |
| 5,471,522 | 11/1995 | Sells et al. | 379/97 |
| 5,483,577 | 1/1996 | Gulick | 379/67 |
| 5,528,666 | 6/1996 | Weigand et al. | 379/58 |

FOREIGN PATENT DOCUMENTS 9006717 10/1991 Germany .

OTHER PUBLICATIONS

Kroschel, K. "Elektronischer Briefkasten." In: nach–richten elektronik + telematik, 37, 1983, H.7, S. 268–271.

Gautherot, M. "Telecom–Signalprozessoren. 32–Bit–Technik für digitale Anrufbeanworter." In: Funk–schau Feb. 1993, S.62–65.

Bollinger, Mario "Zwei Chips für ein Telefon." In: Funk-schau 25/1991. S.70–73.

Kaufberater, "Anrufbeanworter—Die digitale Konkur" (Answering Sets: The Digital Competition, Radio–Show Jul. 1994; pp. 98 to 103).

"Development of SBC Recorder LSI" by: Eguchi, F. et al, Oki Technical Review, vol. 59, No. 138, pp. 21 to 24, Tokyo, Japan.

*Primary Examiner*—Krista M. Zele
*Assistant Examiner*—Daniel Hunter
*Attorney, Agent, or Firm*—Ware, Fressola, Van Der Sluys & Adolphson LLP

[57] ABSTRACT

Creation of an all-digital answering set with voice control, which is able to perform a multitude of functions. The software for performing functions is subdivided into individual software modules which execute sub functions. These can be used in multiple ways and are integrated into a digital signal processor (DSP) of the answering set.

10 Claims, 4 Drawing Sheets

DIGITAL TELEPHONE ANSWERING SET

TECHNICAL FIELD

Many different types of answering sets are known in the state of the art, where differentiations are made particularly between the two main types, namely those with cassettes or with a chip for storing speech. There are also answering sets containing both a chip and a cassette for storing speech. In this case the text of the announcement is stored on the chip, but the incoming messages are recorded on cassettes.

BACKGROUND OF THE INVENTION

In the state of the art, answering sets containing only a chip are called "all-digital answering sets" and have the advantage over answering sets with cassettes that there is no wear-out because of the lack of a cassette mechanism, and the speech quality is increased as well. However, the quality of the speech is not very good in any of the current models of answering sets (Answering Sets: The Digital Competition", Radio-Show 7/1994; pages 98 to 103).

All-digital answering sets were developed to reduce the size and the cost of the devices. The all-digital solution achieved this, as well as increased reliability. The answering sets described in the state of the art use a so-called low bit rate voice synthesizing algorithm. Such answering sets with this algorithm offer basic functions, such as voice recording, voice playback and remote calling ("Development of SBC recorder LSI", by: Eguchi, F. et al; Oki Technical Review; Vol. 59, no. 138, page 21 to 24; Tokyo, Japan). The fact that these answering sets can only perform basic functions is of little advantage.

SUMMARY OF THE INVENTION

It is the task of the present invention to create an answering set which has all-digital operation and increased functionality.

In this case it is an advantage that all the functions of the answering set are executed by software. The individual software modules can be used for several different functions, which can be subdivided into basic functions, such as recording and playing back messages, and into special functions, such as a digital hands-free facility, which leads to a highly integrated compact solution. In addition, this technique is cost-effective since each executable function does not need to have its own hardware created and integrated.

BRIEF DESCRIPTION OF THE DRAWINGS

The invention is explained in greater detail in the following by means of configuration examples and the figures. The figures illustrate.

BEST MODE FOR CARRYING OUT THE INVENTION

Figure 1:
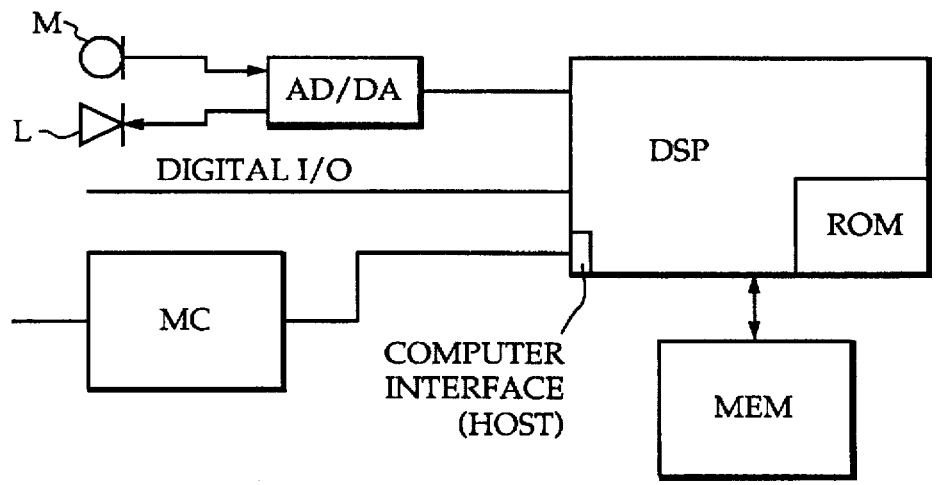
FIG. 1—block circuit diagram of an answering set.

The answering set of the invention is described in the following by means of FIG. 1.

The answering set of the invention comprises a digital signal processor DSP, which contains an internal ROM for the storage of software. The digital signal processor DSP is connected to a memory MEM. The memory MEM can be a commercial audio RAM for example, or an electrically erasable, programmable read-only-memory, a so-called EEPROM (Electrically Erasable and Programmable Read Only Memory), which also includes the block by block erasable flash EEPROM's. The memory MEM is available to the answering set for recording digitalized speech.

An analog interface connects the digital signal processor with a microphone M and a loudspeaker L. In that instance the loudspeaker L and the microphone M are connected with the digital signal processor DSP through an analog-digital/digital-analog converter AD/DA. The microphone M serves to input the analog voice, the loudspeaker L to output the analog voice.

The answering set also contains a digital interface DIGITAL I/O, which is connected with the digital signal processor DSP. For example, a PCM-Codec (Pulse-Code-Modulation-Coder/Decoder) can be connected through the digital interface DIGITAL I/O.

Another example makes it possible for the digital interface to operate in conjunction with a GCI interface.

The answering set further contains a computer interface HOST through which software-implemented basic functions and other special functions as well can be called up and activated. A connection with a microcontroller MC is established through the computer interface HOST, to enable a command and status transfer and also a message and parameter transfer.

Figure 2:
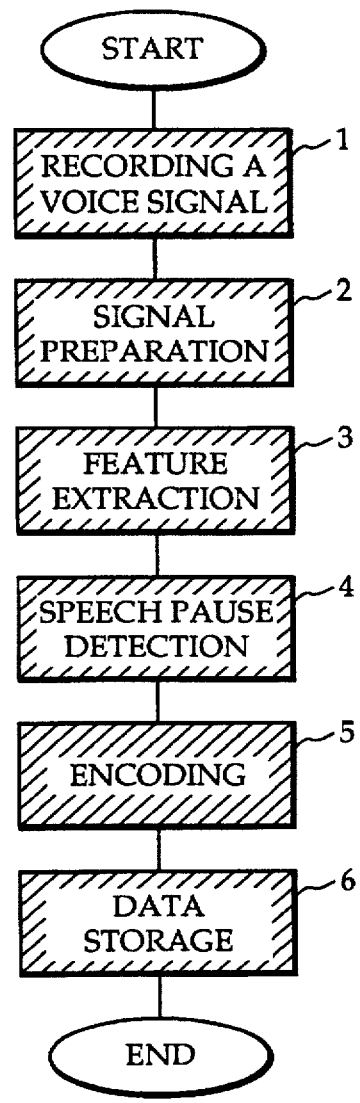
FIG. 2—flow diagram of a recording.

The process of a recording with the answering set of the invention is described in the following by means of FIG. 2.

An analog voice signal is recorded in a first step 1. The signal is prepared in a second step 2. Examples of signal preparation are e.g. voice signal processing with gain control regulation, the so-called AGC (Automatic Gain Control). Another example of signal preparation is preparation by means of so-called offset compensation or by means of a feedback reducer, a so-called echo canceler. A feature extraction is carried out in a third step 3 and a speech pause detection is carried out in a fourth step 4. Coding takes place in a fifth step 5. Voice signals encoded in this manner are stored as data in a sixth step 6. As already described earlier, encoded data of this kind are stored in the memory MEM. The above mentioned six steps 1, 2, 3, 4, 5 and 6 are software modules, of which the software stored in memory MEM is composed. The individual software modules 1 to 6 are multi-use software modules, which is indicated by the hatched boxes in the figure.

Figure 3:
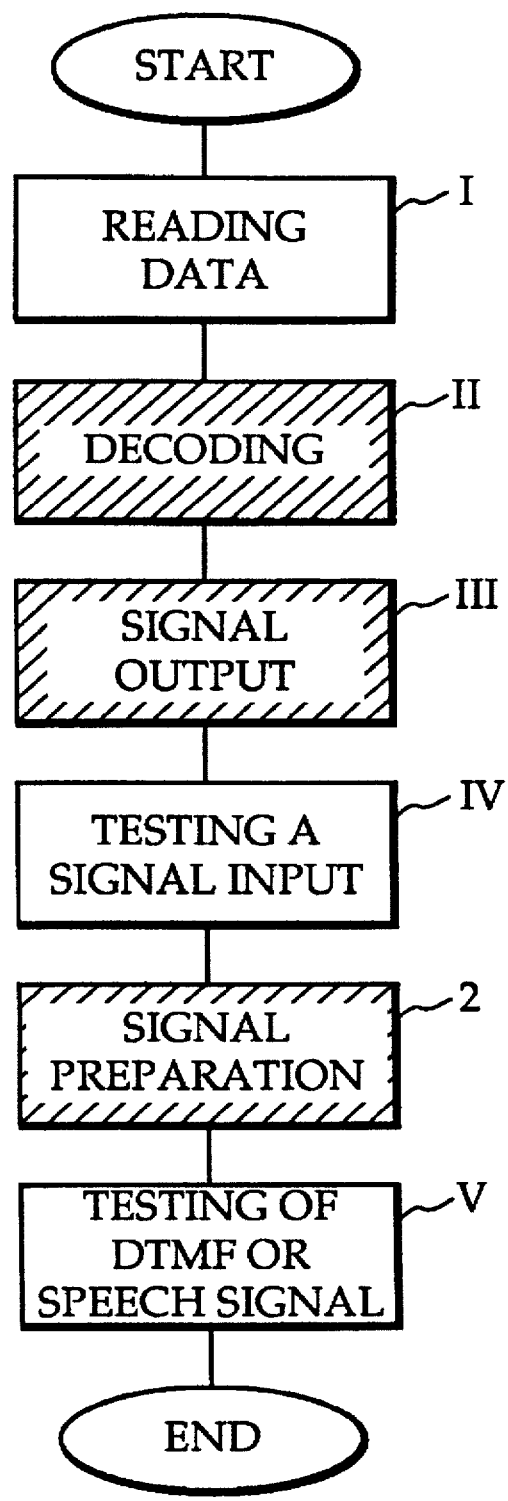
FIG. 3—flow diagram of a playback.

A possible configuration example for a reproduction is given in the following by means of FIG. 3. In a first step I, stored data are read from the memories. Decoding takes place in a second step II. Signal output takes place in a third step III, for example through the analog interface and loudspeaker L. A subsequent step IV is used to test whether a signal has been input through the microphone M and the analog interface, for example. The signal is received and the process continues by preparing the signal in a step 2. This step 2 corresponds to the signal preparation 2 in FIG. 2. Continuing the process, a next step V determines whether a DTMF (Dual Tone Multi-Frequency) signal or a voice signal is present. In the present process diagram, steps II and step III are multi- use software modules.

Figure 4:
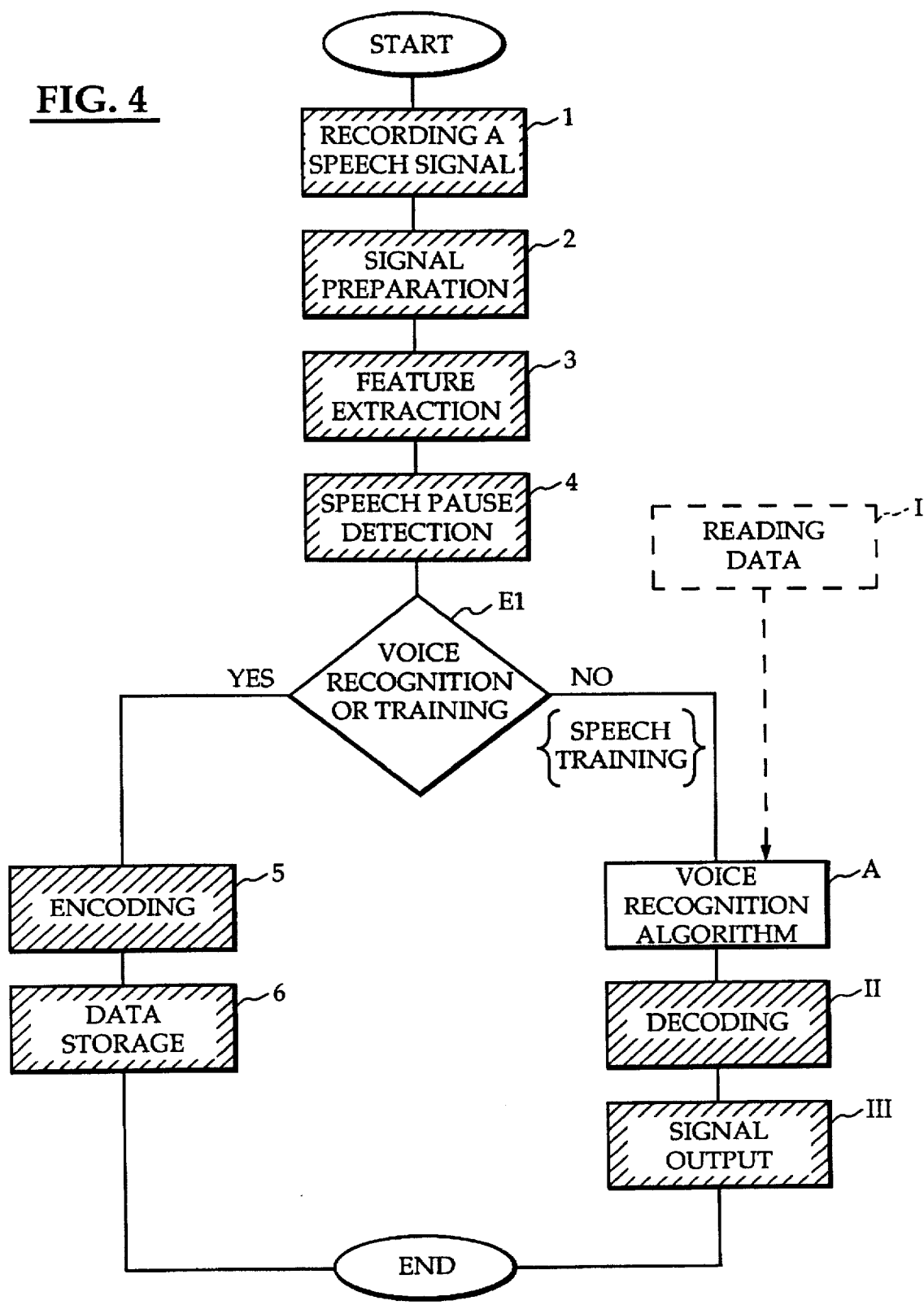
FIG. 4—flow diagram of a voice recognition.

The process of voice recognition is described in greater detail in the following by means of FIG. 4. The first four steps of voice recognition 1, 2, 3 and 4 correspond to the first four steps 1 to 4 in FIG. 2. Accordingly, the first step 1 records a voice signal, the second step 2 is the signal preparation according to the methods already described earlier, the third step 3 is the feature extraction and the fourth step 4 is the detection of speech pauses. A subsequent first decision element E1 decides whether voice recognition or speech training is present. In the event speech training is present, coding takes place in a fifth step 5 and the data is stored in a subsequent sixth step 6.

In the event voice recognition is present, a voice recognition algorithm is activated in the next step A. The data read out in step I in FIG. 3 are available as comparison data for the voice recognition in step A. Decoding takes place in a subsequent step II and the signal is output in a subsequent step III. These two steps II, III were already described in greater detail in FIG. 3.

The process of a digital hands-free facility is explained in detail in the following by means of FIG. 5. As with the preceding examples, a voice signal is recorded in a first step 1. In a further step 2, a signal preparation takes place and in further steps 3 and 4 feature extraction and speech pause detection are performed. The process 1 to 4 described earlier starts with two parallel processes. The difference between the two parallel processes lies in that in one of the two branches the signal preparation contains differences. This branch performs an echo compensation for the modified signal preparation 2a, which is created by the spatial separation and direct coupling between microphone M and loudspeaker L. In contrast, the signal preparation 2 performs an echo compensation of the echo created in the line. In a next step b, the two branches are joined and tested together by means of a control program. An adaptation also takes place. After that, a signal is again output in two independent, parallel branches in a next step III, where one branch depicts that the signal is output through the line and the other branch performs a signal output into the room.

Figure 5:
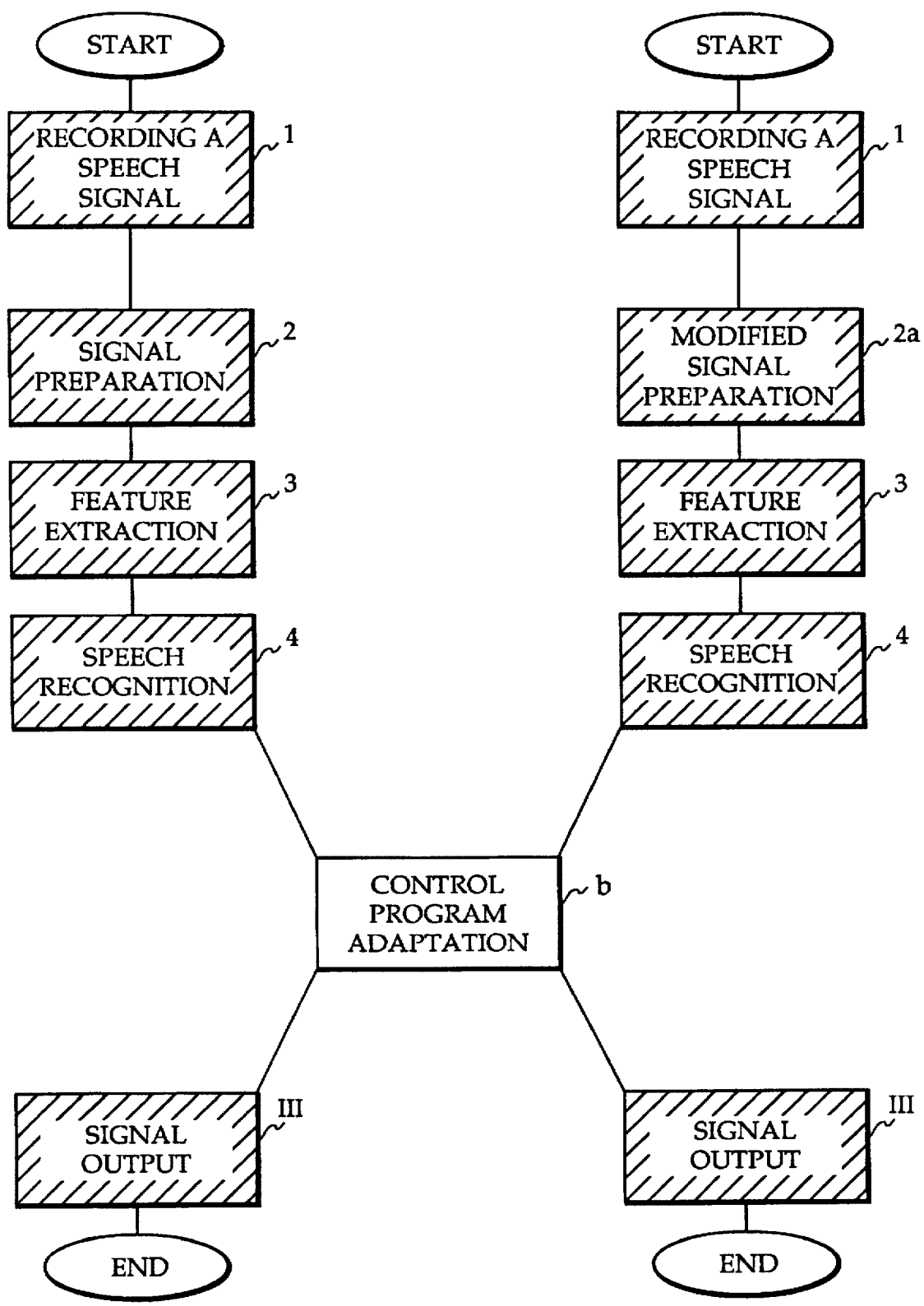
FIG. 5—flow diagram of an hands-free facility.

It should be noted with regard to the preceding FIG. 5 that all steps belong to the multi-use software modules, except for step b, which performs a control and an adaptation.

In summary, it should be noted that the software stored in the digital signal processor DSP is composed of the following software modules:

"1" Recording of a voice signal (an analog voice signal into the line),

"III" Signal output (output of an analog voice signal into the line)

"2" Signal preparation (for example AGC [Automatic Gain Control]),

"2a" Offset compensation, feedback reducer (Echo Canceler),

"3" Feature extraction,

"4" Speech pause detection,

"5" Coding (encoding algorithm for audio signals),

"II" Coding (decoding algorithm for audio signals),

"6" Data storage,

The above named software modules are multi-use software modules. The following lists the software modules that are only used once, or better said for a special process of a special function:

"I" Readout of data (readout of stored data),

"IV" Testing a signal input (into a line),

"V" Testing if DTMF or voice signal,

"A" Voice recognition algorithm,

"b" Control program plus adaptation,

"E1" Decision whether voice recognition or training is present.

The above described multi-use software modules and the software modules that are only used once are just a selection from all possible software modules and no claim is made with regard to completeness. As described earlier, in addition to the basic functions, special functions are also available with the answering set. The following is an overview of the basic functions and special functions that can possibly be performed with the invention. They are:

Low bit rate speech encoding/decoding (low bit rate =5.4 kbit/s),

High quality encoding/decoding (32 kbit/s),

Standard message (outgoing message=OGM) (digitally stored),

Fast forward and reverse for playback of received messages (incoming messages=ICM), "Skip" function (fast forward and reverse between received messages), Erasing of individual or of all messages, Choice of languages, Remote calling through voice recognition and/or DTMF signalling, Training for voice recognition, hands-free facility, Voice reproduction for user guidance, Transmission of messages to computer (HOST), Computation of remaining recording time, Recording and playback of music, Selection of special functions by means of a password (voice recognition with subsequent voice control), Call-up of special functions by means of a clapper switch (Klatschschalter), Determination of predefined or individually definable voice macros.

The last two special functions are described in greater detail in the following.

Clapper switches operate in accordance with the known principle that a sequential function is triggered if a predefined energy threshold is exceeded by clapping (such as hand clapping). Furthermore when triggered by clapping, the occurring special frequency spectrum can be recognized, as with the voice recognition, and a sequential function is triggered if the clapping is recognized as such. For example, a clapper switch is used in the following instances:

A digital answering set is placed in the stand-by mode. In this condition, a user wishes for example to activate any function, such as listening to the recorded messages. To initiate such activation, the user claps his hands thereby activating the voice recognition for example, which serves to trigger further basic functions or special functions. To prevent the digital answering set from being brought from the stand-by mode into the operating mode by another noise of similar loudness, or one with a similar frequency spectrum, a timer element can be provided for example, which returns the digital answering set to the stand-by mode in the event no further recognizable function takes place.

To end a function and return to the stand-by mode, a provision can be made for example that this is triggered by successive double clapping.

In the event the clapping is recognized by the frequency spectrum, the following already explained special functions are activated.

If the clapping is to be recognized by the frequency spectrum, a feature extraction and speech pause detection are performed, as with the voice recognition. This can clearly identify the clapping as such.

Another configuration example makes it possible to activate a monitoring function with an incoming message. Thus, clapping between ring signals for example can activate a monitoring function even before the call is received.

Predefined or individually definable voice macros can be determined in another function. In this case, voice macros mean a number of commands that must be executed in succession to reach a special submenu, and which are triggered by speaking a single word or part of a word.

For example, several individual commands are required to obtain a special adjustment of the digital answering set. It also takes several command steps to obtain monitoring of an incoming call. To that end, the answering set must be taken out of the stand-by mode by operating a key "other" or by speaking "other" into a submenu whereby "other" functions can be called up. After that "settings" must be entered or spoken. This other submenu in turn makes the selection of further possibilities available, from which the function "monitoring" can be chosen. The final selection possibility here is to decide whether "monitoring" should be turned on or off, and whether this should be stored to maintain the condition. These 5 steps can now be automatically activated by the definition of a voice macro when a single word or part of a word is spoken. For example, speaking the word "monitoring" can activate the five steps.

Such a voice macro can either be assigned in advance, or it can be individually defined by a user, where the user can obtain the activation of a special function by means of a made-up word, such as "abracadabra" for example. An individual definition is particularly applicable if a user wants to simplify the call-up of the submenus he uses most often by means of macro commands. In this way, personal passwords can also be changed and reentered by means of voice macros. Other adjustments such as sound volume, ringer tone, selection of the dialing process and dial tone recognition can also be changed and reentered without great effort by means of these voice macros.

What is claimed is:

1. A digital answering set with voice control, comprising:

a digital signal processor (DSP) having a memory (ROM) for storing software which performs basic functions and special functions, having an analog interface connected to an analog/digital-digital/analog converter (AD/DA) for providing loudspeaker output signals to a loudspeaker (L) and for receiving microphone input signals from a microphone (M), and having a computer interface (HOST) for calling up and starting the basic functions and special functions; and another memory (MEM) for storing and providing speech signals;

wherein the software for performing basic functions comprises a number of a first type of software modules which executes portions of the basic functions, wherein the software for performing special functions comprises a number of a second type of software modules which executes special portions of the special functions, and wherein the first type of software modules which executes portions of the basic functions and the second type of software modules which executes special portions of the special functions are used to perform all the functions of the answering set in response to an audio control signal.

2. An answering set as claimed in claim 1, in which the basic functions are voice recording, voice playback and voice recognition, and the special functions are hands-free operation and a voice-controlled remote inquiry.

3. An answering set as claimed in claim 1, in which the other memory (MEM) for storing speech is an audio-RAM or an EEPROM (Electrically Erasable and Programmable Read Only Memory).

4. An answering set as claimed in claim 2, wherein a microcontroller (MC), which is connected to the digital signal processor (DSP) via the computer interface (HOST), performs a command transfer, status transfer, parameter transfer and message transfer.

5. An answering set as claimed in claim 1, wherein the first type of software modules includes algorithms for:

recording of an analog signal,
   preparation of a recorded signal,
   encoding algorithms for audio signals,
   decoding algorithms for the audio signals,
   outputting of the analog signal,
   storing and managing data, and wherein the second type of software modules includes algorithms for:

feature extraction and speech detection,
   voice recognition or sound recognition,
   creating a voice output for user guidance, and
   control functions for the digital hands-free facility.

6. An answering set as claimed in claim 1, with a digital interface (Digital I/O) for the input and output of digital signals when the answering set is used in a digital communications network.

7. An answering set as claimed in claim 5, wherein a clapper switch is used to activate or deactivate functions.

8. An answering set as claimed in claim 1, wherein voice macros are used to execute basic functions and to execute special functions.

9. An answering set as claimed in claim 8, wherein the voice macros are predefined, or the voice macros can be individually defined.

10. An answering set as claimed in claim 1, wherein a microcontroller (MC), which is connected to the digital signal processor (DSP) via the computer interface (HOST), performs a command transfer, status transfer, parameter transfer and message transfer.

* * * * *